United States Patent [19]

Fairlamb

[11] Patent Number: 4,527,587
[45] Date of Patent: Jul. 9, 1985

[54] CONNECTOR ASSEMBLY FOR A GAS

[75] Inventor: George R. Fairlamb, Bridgehampton, N.Y.

[73] Assignee: Union Carbide Canada Limited, Toronto, Canada

[21] Appl. No.: 479,532

[22] Filed: Mar. 28, 1983

[51] Int. Cl.³ ............................................. F16K 43/00
[52] U.S. Cl. ........................... 137/329.3; 137/614.19; 137/614.2; 251/149.4; 251/149.5; 251/149.6
[58] Field of Search ............... 137/329.1, 329.2, 329.3, 137/329.4, 614.19, 614.2; 251/149.4, 149.5, 149.6, DIG. 1

[56] References Cited

U.S. PATENT DOCUMENTS

| | | | |
|---|---|---|---|
| 1,703,861 | 3/1929 | Bohnhardt | 137/329.3 |
| 2,278,580 | 4/1942 | Coles et al. | 137/329.4 |
| 3,563,267 | 2/1971 | Thompson | 137/329.1 |
| 4,190,075 | 2/1980 | Kayser | 137/329.1 |

Primary Examiner—George L. Walton
Attorney, Agent, or Firm—James C. Arvantes; William G. Hopley; Albert E. Koller

[57] ABSTRACT

A valve assembly for dispensing a gas, particularly for medical use into a connector of a gas using device, comprising: an outer body with an internal passageway containing a valve seat and a valve member which is lifted from said seat by rearward pressure, an inner body threaded into the passageway of the outer body and having an internal passage and a plunger within said passage which includes an activating member adopted to hold the valve member away from the valve seat when the plunger is moved rearwardly, the plunger and inner body having interlocking parts by which rotation of the plunger requires rotation of the inner body, said inner body has a stepped profile on the outside for mating with a complementary stepped bore in the outer body and a stepped bore on the inside for mating with a hose connector.

7 Claims, 7 Drawing Figures

CONNECTOR ASSEMBLY FOR A GAS

This invention relates generally to connector assemblies for gases, and has particular relevance to gas connector assemblies utilized in hospitals and the like for dispensing various medical gases such as oxygen, nitrous oxide and nitrogen to collecting bottles, anaesthesia machine tubing, inlets and outlets, ventilators, incubators, flowmeters and regulators, oxygen generators and Walker units.

While it will be evident from what follows that the present invention is not limited to medical applications, there are particular problems associated with the current method of gas dispensing in hospitals which this invention resolves. It is therefore appropriate to discuss the drawbacks of the conventional practice in this regard so that the advantages of this invention will be more clearly perceived.

BACKGROUND OF THIS INVENTION

The current construction of the medical gas connector assemblies utilized in hospitals and the like for dispensing medical gases such as nitrous oxide, nitrogen, oxygen, etc., is such that there is a serious risk of interchanging the gas-specific portions of each connector assembly after disassembly for purposes of repair or cleaning. The gas-specific portions of the connector assemblies, for gases such as nitrogen, nitrous oxide and air, define diameter-indexed, two stage bores having a first diameter adjacent the entrance end and a smaller diameter further inward from the entrance end. The connector elements at the ends of hoses or gas using devices intended to receive the different gases are also diameter-indexed, i.e. in two steps, with a smaller diameter at the tip and a larger diameter further inwardly from the tip. In each case, the diameters of the hose connectors are complementary to the appropriate diameters of the assemblies into which they are inserted. Once inserted, the appropriate size of nut is threaded onto threads externally of the assembly, to hold the connector in place. Thus the nuts are also gas-specific. The insertion of the connector depresses a plunger located internally of the assembly, and this in turn opens a check-valve to admit gas into the connector.

A standard code has been adopted throughout North America in regard to hand-tightened assemblies for dispensing medical gases, and is known generally as the D.I.S.S. system (Diameter-Index Safety System). Simply stated, the non-interchangeable indexing is achieved by a series of increasing and decreasing diameters. Thus, the gas for which the outermost diameter is largest will also have the smallest innermost diameter. The next gas would have a slightly smaller outer diameter and a slightly larger inner diameter, and so forth. This prevents full insertion of any but the connector for the correct gas using device.

As previously stated, however, the part which defines the two-stage bore of the D.I.S.S. system (as constructed by a number of manufacturers) can itself be removed by unscrewing from a rearward portion of the complete assembly, normally called the rear coupler. All of these portions, called front couplers, have identical threaded bosses with the same thread size and diameter (9/16"—18), and any one of them can be threaded into all of the rear couplers. Thus it occasionally happens that the serviceman, after disassembly for cleaning or repair, inadvertently interchanges the front couplers. In a medical situation, of course, this is highly dangerous, and could result in the administration of the wrong gas to a patient.

It is an aspect of this invention to provide replacement parts compatible with existing installations, and which are constructed in such a way as to eliminate any risk of interchangeability during servicing and repair.

Another aspect of this invention is to provide complete assemblies for new installations, which likewise eliminate the risk of interchangeability during servicing or repair.

GENERAL DESCRIPTION OF THIS INVENTION

Accordingly, this invention in its simplest form provides a valve assembly for dispensing a gas into a suitable connector, the valve assembly consisting basically of an outer body and an inner body. The outer body has an internal passageway for the gas which opens through a front end of the outer body, and the inner body is threaded into the passageway from the front. The inner body has an internal opening which, with the passageway, defines a continuous passage. An axially movable plunger is located in the opening of the inner body. Valve means are located in the passage, the valve means being normally closed but being opened by the rearward movement of the plunger. The plunger and the inner body have complementary, close-fitting, non-round portions by which rotation of the plunger requires rotation of the inner body. The plunger has means by which a suitable tool can rotate the plunger and thus the inner body.

In another aspect, this invention further provides a combination of elements for use with a rear coupler that has an internal passageway communicating with an internally threaded bore. The combination of elements includes an outer front body threaded into the bore and having an internal opening for communication with the threaded bore. A valve seat is located within the internal opening and a valve member is adapted to be lifted from the valve seat by rearward pressure thereagainst. An inner front body is provided and is threaded into the internal opening. A plunger is located within an internal passage in the inner front body, and has an activating member adapted to lift the valve member from the seat when the plunger is moved to the rear. The plunger and the inner front body have interlocking portions by which rotation of the plunger requires rotation of the inner front body. The plunger includes means by which a suitable tool can rotate the plunger.

In still another aspect, this invention provides a method of rendering non-interchangeable a plurality of connector assemblies for different gases each of which includes a rear coupler with an internal passageway for the respective gas, the internal passageway communicating with an internally threaded bore in the coupler. All such bores are identical. The method involves the provision and utilization of a plurality of front assemblies, each including an outer front body with an externally threaded boss for engagement with a bore, and an internal opening through each outer front body and boss. A valve seat is located in the internal opening of each outer front body and a valve member is provided for seating against each valve seat in a manner such that it can be lifted from the seat by rearward pressure. An inner front body is also part of each front assembly, and is threaded into the internal opening of each outer front body. An internal passage within each inner front body contains a forwardly urged plunger having an activating member adapted to lift the valve member from the valve seat when the plunger is moved to the rear. Each plunger and the respective inner front body have interlocking parts by which rotation of the plunger requires rotation of the inner front body. Each plunger has means by which a suitable tool can rotate it. Further, each inner front body has a portion projecting forwardly from the location of the respective plunger, the portion having (1) a stepped profile on the outside for mating with a complementary stepped bore in the outer front body, and (2) a stepped bore on the inside for mating with a complementary gas-receiving connector. The outside stepped profile of each portion is complementary only with its own respective outer front body and is incapable of interfitting with another outer front body of the plurality of front assemblies. The inner stepped bore of each portion is complementary with the connector for only one of the different gases.

The method further includes, in any order, the steps of threading the boss of each outer front body into an appropriate one of the rear couplers depending on the gas for that rear coupler, and simultaneously locking together the threaded connection just described so that excessive force is required to detach it, and threading the appropriate one of the plurality of inner front bodies into each outer front body.

GENERAL DESCRIPTION OF THE DRAWINGS

Five embodiments of this invention are illustrated in the accompanying drawings, in whch like numerals denote like parts throughout the several views, and in which.

DETAILED DESCRIPTION OF THE DRAWINGS

Figure 2:
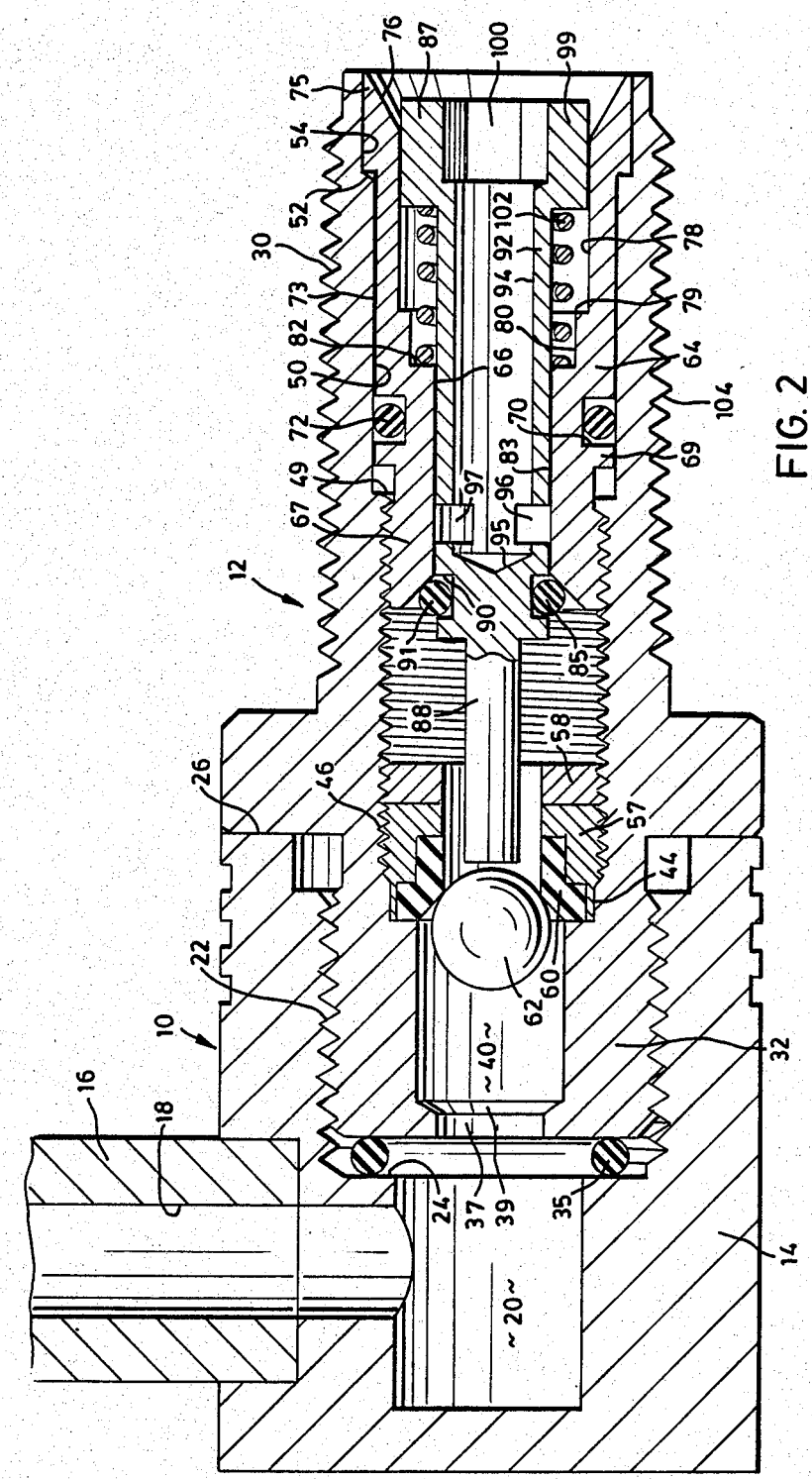
FIG. 2 is an axial sectional view through a second embodiment of an outlet assembly suitable for oxygen.

Attention is first directed to FIG. 2, which shows a connector assembly for a gas, particularly a medical gas, which includes a rear coupler shown generally at 10, and a front replacement assembly shown generally at 12. The rear coupler 10 is in the form of a generally cylindrical body 14, typically of brass, to which a gas conduit 16 is soldered. The gas conduit 16 has an internal bore 18 which is continuous with and in communication with an internal passageway 20 in the rear coupler. The internal passageway 20 includes an enlarged and internally threaded section 22, which terminates leftwardly or rearwardly at a shoulder 24. At the rightward or forward end of the rear coupler 10 is an abutment shoulder 26.

Figure 5:
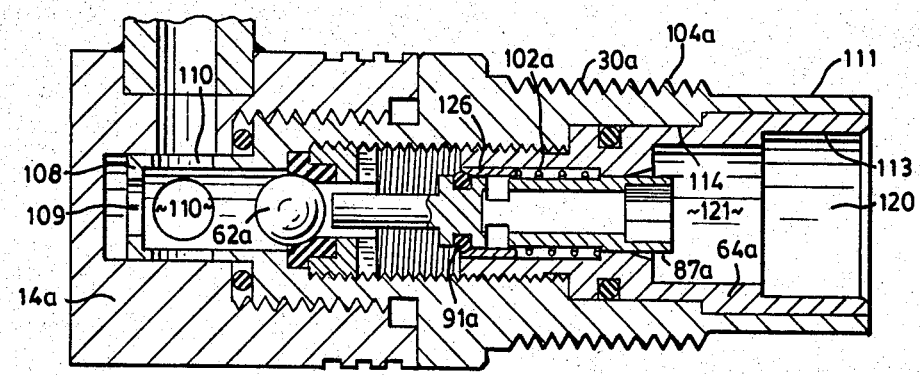
Figure 6:
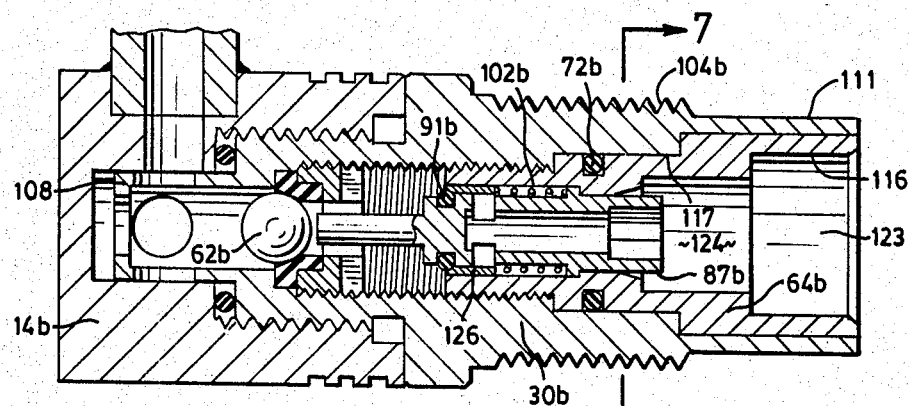

In conventional practice using the D.I.S.S. system, a forward member is screwed into the threaded section 22, the forward member being largely a unitary member which projects rightwardly or forwardly to define a two-diameter stepped bore such as that shown at the right in FIGS. 5 and 6, with a simple biased plunger and a one-way check valve adapted to be unseated by the plunger when pushed leftwardly or rearwardly. Such structure would be adapted for a gas other than oxygen, for example air, nitrous oxide or nitrogen. In the case of oxygen, the standard forward member would resemble that shown in FIG. 2 in its outer configuration, but inwardly would simply define a bore along which a plunger could slide, the plunger again being adapted to unseat a one-way check valve when pushed leftwardly or to the rear.

As previously mentioned, since all such conventional forward members have the same rearward threaded boss, capable of engaging any of the rear couplers, there is a great risk that, subsequent to disassembly for repair or servicing, the forward members could be interchanged, thus leading to the inadvertent use of the wrong gas. In a medical context, this could have dire results.

Attention is again directed to FIG. 2, for a description of the front assembly 12.

The front assembly 12 shown in FIG. 2 includes an outer front body 30 which has an externally threaded boss 32 for engagement in the threaded bore 22 of the rear coupler 10. The outer front body 30 also has an internal passageway or opening communicating with the threaded bore section 22 and thus with the passageway 20. An annular sealing member 35 is captured between the rear of the threaded boss 32 and the shoulder 24, to prevent gas access to the threads of the bore section 22. It will be seen from what follows that the outer front body 30 is intended not to be removed from the rear coupler 10, after it has been initially inserted, and to this end a suitable locking compound such as "Locktight" (trade mark) may be applied to the mating threads in order to secure them together and resist manual unscrewing.

The internal opening of the outer front body 30 includes a first cylindrical portion 37, a frusto-conical portion 39, a second cylindrical portion 40 of larger diameter than the cylindricl portion 37, an annular shoulder 42 extending outwarding from the forward end of the cylindrical portion 40, a short cylindrical portion 44 extending forwardly from the shoulder 42, a threaded portion 46 extending rightwardly or forwarding from the cylindrical portion 40, a further shoulder 49 at the rightward end of the threaded portion 46, a cylindrical portion 50 extending rightwardly from the shoulder 49, a frusto-conical portion 52 at the rightward end of the cylindrical portion 50, and a further cylindrical portion 54 extending to the front end of the outer front body 30.

Screwed into the threaded portion 46 is a threaded retaining ring 57 having a diametral slot 58 at its rightward end for engagement with a screwdriver. The retaining ring 57 has an internal recess sized to receive a resilient member 60 defining a valve seat for a one-way primary check valve member. The primary check valve member is a ball 62 which is adapted to seat rightwardly against the resilient member 60, and can be lifted off the seat defined by the resilient member 60 by means of leftward or rearward pressure. The retaining ring 57 is adapted to abut the shoulder 42 and to be tightened in place thereagainst.

Also threaded into the threaded portion 46 is an inner front body 64 having an internal passage 66, and having at its rear end (leftward end) a threaded portion 67 adapted to engage the threaded portion 46 of the passageway within the outer front body. Forwardly of the threaded portion 67, the inner front body 64 has an integral outward annular flange 69 defining one face of an annular gallery 70 adapted to receive an annular sealing member in the form of an O-ring 72. Forwardly of the gallery 70, the inner front body 64 defines a cylindrical outer surface 73 sized to be snugly but slidably received within the cylindrical portion 50 of the passageway within the outer front body 30. At the front or rightward end of the inner front body 64 is a nose portion 75 of slightly larger diameter, sized to be snugly but slidably received within the cylindrical portion 54 of the passageway within the outer front body 30. The rearward limit of movement of the inner front body 64 is determined by engagement of the nose portion 75 with the frusto-conical portion 52.

The internal passage 66 within the inner front body 64 includes a frusto-conical portion 76, which adjoins a section 78 of hexagonal configuration, the latter terminating leftwardly at a shoulder 79 from which a short cylindrical portion 80 extends leftwardly. The latter terminates in a further shoulder 82 from which leftwardly extends a narrower cylindrical portion 83, the latter joining a frusto-conical portion 85 at the leftward end.

Within the internal passage 66 of the inner front body 64 is located a plunger 87 which includes a leftwardly extending cylindrical activating member 88 adapted to press leftwardly against the ball 62 and open the check valve upon leftward or rearward movement of the plunger 87. The main body of the plunger 87 is larger in diameter than the activating member 88, and has an annular gallery 90 receiving an annular O-ring sealing member 91 which mechanically interferes with the frusto-conical portion 85 of the internal passage 66 of the inner front body 64, so that when the plunger 87 moves to the right, a further seal is effected against passage of pressurized gas from the passageway 20. It will be appreciated that the O-ring 72 also provides a seal against leakage of gas past the engaged threads of the threaded portion 67 of the inner front body 64.

The plunger 87 has a main cylindrical body 92 in the form of a hollow cylinder, thus defining an internal cylindrical passageway 94 which terminates leftwardly at the conical surface 95 (formed by the drill bit). Two diametrally opposed openings 96 and 97 are cut into the cylindrical side wall, so that when the plunger 87 is moved to the left, the interior of the passageway 94 can communicate with the passageway within the outer front body 30.

At its rightward or forward end, the plunger 87 widens to define a hexagonal boss 99 which is sized to fit snugly but slidably within the hexagonal section 78 of the internal passage 66 within the inner front body 64. The hexagonal boss 99 has a central hexagonal recess 100 adapted to receive an Allen wrench, and is merely a widened forward portion of the passageway 94.

A resilient compression coil spring 102 abuts against the back of the hexagonal boss 99 and against the shoulder 82, and its function is to urge the plunger 87 forwardly or rightwardly to the position shown in FIG. 2. An important feature of the coil spring 102 relates to the fact that it has been removed from the gas passage areas and is encapsulated between the inner front body 64 and the plunger 87. By removing the spring from contact with oxidizing or corrosive gas, the life of the spring is dramatically increased. Spring deterioration has been a major cause of wall outlet problems in the past. A further advantage relates to the fact that the spring does not contribute to turbulence in the gas flow, since it is not in the gas flow as in the prior art. As a result, gross air flows are significantly increased.

The embodiment just described with respect to FIG. 2 is particularly adapted for an oxygen outlet in accordance with conventional standards in use. This practice requires that the oxygen using device be equipped with a rounded nose portion or nipple adapted to make a good surface seal against the frusto-conical portion 76 of the inner front body 64. The oxygen hose also has a nut adapted to be threaded on the external threads of the outer front body 30, shown at 104 in FIG. 2, in order to urge the rounded portion of the oxygen coupling into the frust-conical portion 76. In so doing, the rounded portion of the oxygen coupling presses leftwardly or rearwardly against the plunger 87, thus releasing the seal at the sealing member 91, pushing the ball 62 leftwardly away from the resilient member 60 against which it seats, and allowing the passageway 94 within the plunger to communicate with the pressurized gas through the openings 96 and 97.

Figure 4:
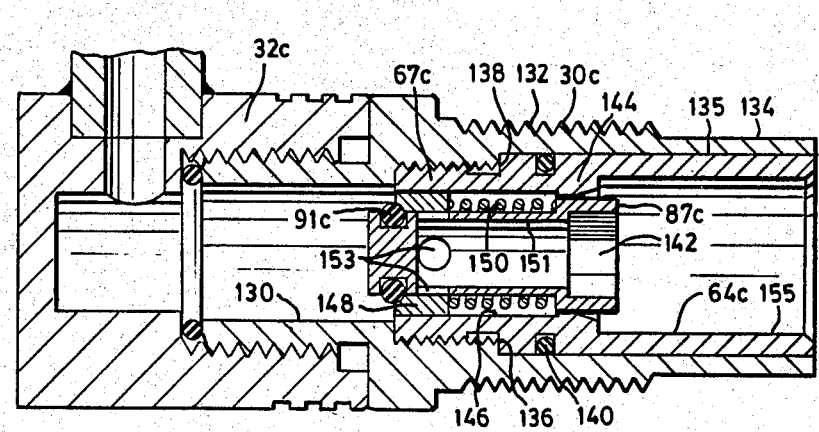
FIGS. 4, 5 and 6 are axial sectional views of fourth, fifth and sixth embodiments suitable for suction, air and nitrous oxide, respectively.

Attention is now directed to FIGS. 4, 5 and 6, for a description of three additional embodiments of this invention. With reference to these additional figures, it is not necessary to describe in great detail all of the portions, surfaces, seals and the like already described with reference to FIG. 2. For the most part, these portions are identical in the embodiments of FIGS. 2, 4, 5 and 6. The following description concentrates on the areas where the structure is distinguishable from the embodiment shown in FIG. 2.

Turning first to FIGS. 5 and 6, there is shown a preferred construction for two "converted" outlets for air and nitrous oxide, respectively. In each of the embodiments of FIGS. 5 and 6, the rear couplers 14a and 14b are the same as the rear coupler 14 in FIG. 2. The outer front bodies 30a and 30b differ from the outer front body 30 in FIG. 2, in that each of them includes a rearwardly extending, intergral, hollow boss 108 with an end opening 109 and four radial openings 110 for admission of gas into the interior of the outer front body 30a, 30b.

The forward portion of each outer front body 30a, 30b has threads 104a, 104b of larger diameter than the threads 104 in FIG. 2, and includes a smooth outer cylindrical surface 111 projecting forwardly from the threads 104a, 104b. Internally, the passageway within each outer front body 30a, 30b is similar to that in FIG. 2 at the rear, but forwardly or rightwardly defines a stepped internal profile which provides two different diameters and a shoulder between them. In FIG. 5, the stepped profile includes a forward larger diameter 113, and a rearwardly adjacent smaller diameter 114. In FIG. 6, the larger diameter is identified by the numeral 116, and the smaller diameter by the numeral 117. As can be seen by comparing FIGS. 5 and 6, the larger and smaller diameters 113 and 114 in FIG. 5 are smaller and larger, respectively than the corresponding diameters 116 and 117 in FIG. 6. Because of this difference, a member cut to fit snugly and complementally within one of the stepped profiles will not fit within the other of the stepped profiles. In essence, such a complementary member is constituted by the inner front body 64a, 64b for th two embodiments of FIGS. 5 and 6. The inner front bodies 64a and 64b of FIGS. 5 and 6 differ from the inner front body 64 of FIG. 2 primarily in the forward extending portion which defines the stepped profile complementary to that of the outer front bodies 30a and 30b. Internally, the inner front bodies 64a and 64b define similar stepped profiles which are adapted to fit correctly with the nozzle for only one gas and not for any other. Specifically, in FIG. 5, the inner front body 64a defines a forward larger diameter 120, and a rearwardly adjacent smaller diameter 121. Likewise the inner front body 64b of FIG. 6 defines a forward larger internal diameter 123, and a rearwardly adjacent smaller internal diameter 124. Again it will be appreciated that a member designed to fit snugly and in a complementary fashion into the stepped internal profile of the inner front member 64a will not be able to be inserted into the profile of the inner front member 64b, and vice versa.

The plungers 87a and 87b in FIGS. 5 and 6 are slightly shorter than the plunger 87 in FIG. 2, and the resilient springs 102a and 102b are captured between an outward flange on each plunger and a press-fit collar 126 within the rear portion of the inner front bodies 64a and 64b. However, the functioning of the plunger is the same as that already described with reference to FIG. 2. More specifically, when the connector for the specific gas is inserted into the stepped profile defined within the forward end of the respective inner front body 64a, 64b in FIGS. 5 and 6, it pushes leftwardly or rearwardly against the respective plunger, which unseats the check valve constituted by the ball 62a, 62b, and also unseats the sealing member 91a, 91b on the plunger 87a, 87b.

Again, in assembling the outer front members 30a, 30b to respective rear couplers for the different gases, a locking compound of a suitable nature would be applied to the threaded engagement between them, in order to prevent manual removal.

It will now be apparent that disassembly of the embodiments shown in FIGS. 2, 5 and 6 for cleaning, repair or replacement of parts will be accomplished by unscrewing only the inner front member 64, 64a or 64b as the case may be, as this allows the plunger to be removed together with the inner front body, and allows access to the retaining ring 57 and the ball 62, 62a, 62b.

Rotation of the inner front body 64, 64a or 64b is accomplished by inserting a suitable Allen wrench into the hexagonal recess 100 of the respective plunger, and rotating the same. In each case, the plunger has a foward portion of hexagonal profile fitting snugly but slidably within a hexagonally profiled portion of the inner front body. This interlocking fit allows an Allen wrench to be used to remove the inner front member.

Attention is now directed to FIG. 4, which shows a replacement assembly for a typical suction outlet. Because of the suction, the one-way check valve constituted in the previous described embodiments by the ball 62 seating against the resilient member 60 is not provided. Instead, the seal is made by an O-ring 91c in a gallery at the rear of the plunger 87c, and the plunger itself does not have any rearwardly extending activating member such as that shown at 88 in FIG. 2. Turning first to the outer front body 30c in FIG. 4, this can be seen to include a threaded boss 32c similar to the boss 32 in FIG. 2, but with a larger diameter central bore 130. The latter widens forwardly to provide a shoulder against which the rearward threaded portion 67c of the inner front body 64c abuts, engaging suitable threads. The outer front body 30c then provides a threaded forwardly extending portion 132, and a non-threaded cylindrical portion 134 forwardly of the portion 132. The inner front body 64c has a constant-diameter outer surface 135 which terminates rearwardly in an abutment surface 136 abutting a shoulder 138 of the outer front body 30c. Cut into the inner front body 64c is an annular gallery containing an O-ring seal 140 which bears against the internal cylindrical surface of the outer front body 30c.

The plunger 87c has a somewhat greater diameter than the plungers 87a and 87b shown in FIGS. 5 and 6, and the internal passageway in the inner front body 64c is likewise larger. More specifically, the plunger 87c has a hexagonal portion 142 at the front or rightward end, being hexagonal both in outer and inner profile. This mates snugly but slidably with a hexagonal portion 144 of the inner front body 64c. Rearwardly of the portion 144 is a cylindrical bore 146 in the inner body 64c, and this receives a press-fit retaining ring 148 which defines a frusto-conical surface to the rear, against which the O-ring 91c can seat, and which provides an abutment for the rearward end of a compression coil spring 150 which bears with its front end against the back of the hexagonal boss 142 of the plunger 87c.

The plunger 87c in FIG. 4 has a central bore 151, and this is perforated by a plurality of openings 153 at the rear, so that when the plunger 87c is moved rearwardly to open the seal effected by the O-ring 91c, the suction to the left or rear of the plunger 87c can be communicated to the region to the right of the plunger. The assembly shown in FIG. 4 is adapted to interfit with the coupler end of a suction using device, the end having a nozzle portion adapted to fit snugly but slidably within a cylindrical bore 155 of the inner front body 64c, and to depress the plunger 87c rearwardly. A nut on the connector is adapted to be threaded on the threads 132.

Figure 1:
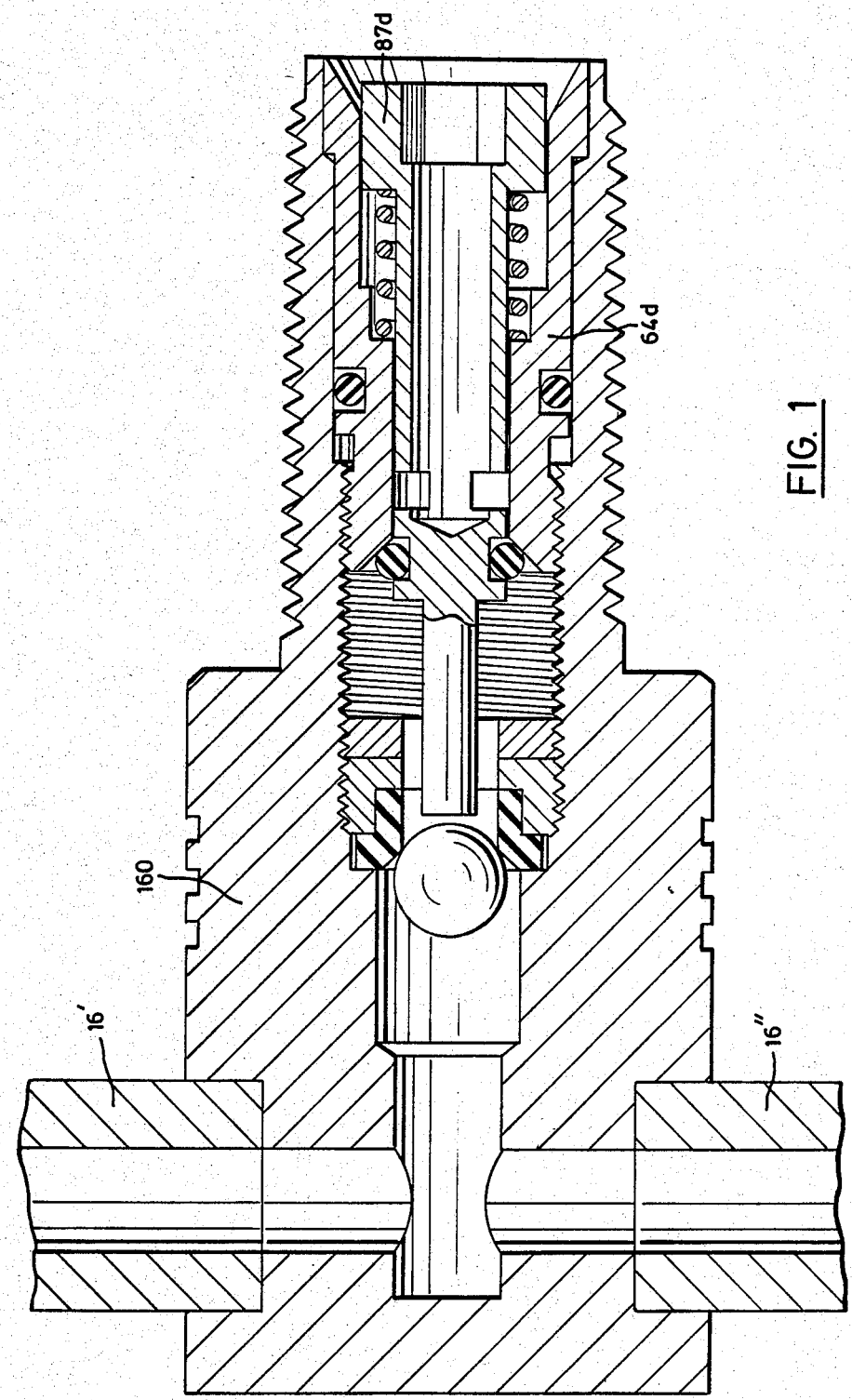
FIG. 1 is an axial sectional view through one embodiment of an outlet assembly suitable for oxygen.

Attention is now directed to FIG. 1, which shows an assembly very similar to that shown in FIG. 2, except that the rear coupler 14 and the outer front integral member in FIG. 1. Also, the FIG. 1 embodiment shows two conduits 16' and 16" connecting into the composite body 160 from diametrally opposed directions.

The inner front body 64d and the plunger 87d are identical to the equivalent parts in FIG. 2, as are all of the associated members including the rear check valve. Detailed description of these parts is therefore not necessary.

It will be appreciated that the embodiment shown in FIG. 1 is adapted for new installations where it is not necessary to retrofit into existing rear couplers such as that shown at 14 in FIG. 2.

Figure 3:
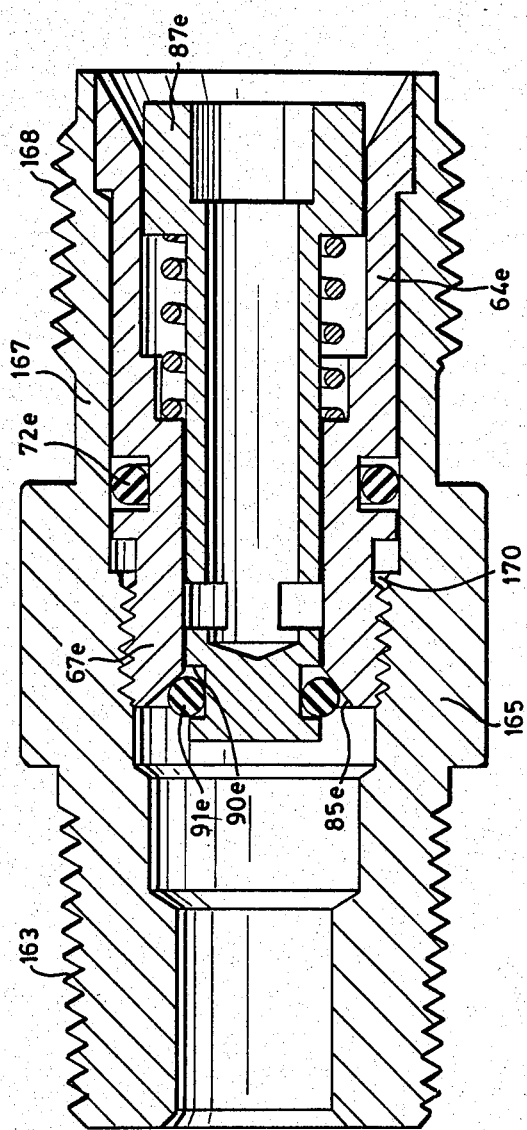
FIG. 3 is an axial sectional view through a third embodiment of an outlet assembly suitable for oxygen.
Figure 7:
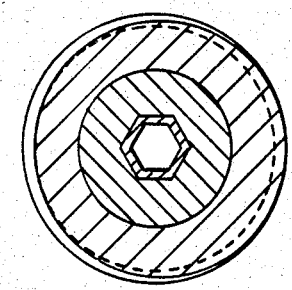
FIG. 7 is a cross-sectional view taken at the line 7—7 in FIG. 6.

FIG. 3 shows a further embodiment of the oxygen outlet assembly. In this embodiment, the connection into the rear coupler is by a pipe thread (tapering thread) 163, which may typically be a ¼" NPT connection. This should also be installed with a locking compound to make it a "permanent" connection. The outer front body 30e includes a central hexagonal portion 165 adapted to be turned by a wrench, and has a forward portion 167 with threads 168 engageable by the oxygen coupling nut. Internally, the outer front body 30e shown in FIG. 3 has a passageway very similar to that shown in FIG. 2, including threads 170 for receiving the rear threaded portion 67e of an inner front body 64e identical in all respects to the inner front body 64 shown in FIG. 2.

In FIG. 3 there is also shown a plunger 87e which is identical to the plunger 87 in FIG. 2, except for the absence of the activating member 88. In FIG. 3, there is no check valve comparable to that defined in FIG. 2 by the ball 62, the resilient member 60 and the retaining ring 57. Instead, the pressurized gas (oxygen) is retained by the O-ring sealing member 91e within the gallery 90e at the rear of the plunger 87e. The sealing member 91e rests and seals against the frusto-conical portion 85e defined at the rear of the inner front body 64e. Again, an O-ring seal 72e is provided in the embodiment of FIG. 3, to prevent escape of pressurized gas through the mating threads of the threaded portion 67e.

It is to be understood that the structure shown in FIGS. 1 and 3 could also be adapted to the standard connections for the other gases, for example air and nitrous oxide, without altering the structure and function of the internal portions thereof. The outer front body would simply be extended to the front to provide the stepped profile, and the inner front body would likewise be extended and given a stepped profile both on the outside and the inside.

It will thus be seen that the present invention provides a means of retrofitting existing medical gas connections by providing front assemblies compatible with existing rear couplers, having a construction such that a portion thereof (the outer front body) can be permanently locked into place with respect to the rear coupler, while the internal components (the inner front body, the plunger and the ball check valve) can be removed for cleaning, servicing, etc. The risk of destroying the safety and integrity of the medical gas connections by the inadvertent crossing or interchanging of the various internal parts is thus eliminated.

The invention also permits new installations in which the rear coupler and outer front body are combined together in a single component, thus again eliminating the risk of interchanging the internal parts.

The various components illustrated herein are light in weight, easily machined and simply to apply and remove. They are usable for original wall outlet use, for converting all present non-D.I.S.S. outlets to new, high-volume D.I.S.S. front loaded outlets, for updating all present D.I.S.S. wall outlets to non-interchangeability with indexed front loaded replacement cartridges, and for light-weight, one-piece sealing drops that can be serviced without disassembly. Due to the large internal bores that are possible with the present design, this invention allows the conversion of all present systems to high-volume gas-oriented wall extensions which are front-loaded.

Because of this construction, complete servicing can be carried out without distrubing the wall covers or name plates, and can be accomplished by semi-skilled people in less than three minutes compared to twelve or fifteen minutes for present wall systems. The larger permissible diameters allow dramatically increased gas flows, and down times are reduced to almost zero. Both the primary and secondary checks can be removed from the front and serviced or replaced without shutting the system down or marking up the surrounding wall area. Noise, dirt and confusion are eliminated, the cost of replacement, repair and cleaning is reduced, and all steps can be carried out by hospital personnel without any possibility of crossing gases during the repair or servicing.

While certain specific embodiments of this invention have been illustrated in the accompanying drawings and described hereinabove, it will be evident to those skilled in the art that changes and modifications may be made therein, without departing from the essence of this invention as set forth in the appended claims.

I claim:

1. A valve assembly for dispensing a gas into the connector of a gas using device, comprising:
    (a) an outer body with an internal passageway for gas opening through the front end of the outer body, said passageway containing a valve seat and a valve member which is lifted from said valve seat by rearward pressure;
    (b) an inner body threaded into said passageway from the front end of the outer body and having an internal opening with which said passageway defines a continuous passage through said assembly;
    (c) an axially moveable plunger within said internal opening, said plunger including an activating member adapted to hold the valve member away from the valve seat when the plunger is moved axially in the direction of said outer body, a portion of the plunger having a non-round section complementary to and fitting within a non-round section of the inner body whereby the plunger can be rotated using a suitable tool thereby rotating the inner body and disconnecting said inner body from said outer body, and
    (d) an opening in said plunger for providing a passage for gas between said passageway and said internal opening when the plunger is moved towards the valve seat.

2. The connector assembly claimed in claim 1, in which the inner front body has a portion projecting forwardly from the location of the plunger, the said portion having a stepped profile on the outside for mating with a complementary stepped bore in the outer front body, and the said portion also having a stepped bore on the inside for mating with a complementary connector for a gas using device.

3. The connector assembly claimed in claim 1, in which the inner front body has a forwardly and outwardly diverging internal surface adapted to make a pressure seal with an oxygen nipple, the outer front body having on its front end external threads for engaging a nut adapted to hold an oxygen nipple in place.

4. The connector assembly claimed in claim 2, in which the plunger has an internal passageway through which gas passes when the plunger is moved toward the rear, the connector including further sealing means for closing said internal passageway when the plunger is at its most frontward position.

5. The connector assembly claimed in claim 4, in which said internal passageway has a hexagonal section at the front and can receive a hexagonal wrench, said non-round sections of the plunger and the passage being hexagonal.

6. The connector assembly claimed in claim 1, in which the resilient means is a compression coil spring which is out of the path of the gas flow.

7. A valve assembly as claimed in claim 6 wherein said outer body comprises a rear coupler having an internal passageway for gas, the passageway communicating with an internally threaded bore in said coupler, and an outer front body having an externally threaded boss engaged in the threaded bore of said coupler and an internal opening communicating with the internal passageway of the rear coupler.

* * * * *